(12) United States Patent
Vadapandeshwara et al.

(10) Patent No.: US 11,068,306 B2
(45) Date of Patent: Jul. 20, 2021

(54) RE-USING DATA STRUCTURES BEYOND THE LIFE OF AN IN-MEMORY PROCESSING SESSION

(71) Applicant: ORACLE FINANCIAL SERVICES SOFTWARE LIMITED, Mumbai (IN)

(72) Inventors: Rajaram Narasimha Vadapandeshwara, Bangalore (IN); Pramit Dey, Kolkata (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 299 days.

(21) Appl. No.: 16/427,489

(22) Filed: May 31, 2019

(65) Prior Publication Data

US 2020/0097325 A1 Mar. 26, 2020

(30) Foreign Application Priority Data

Sep. 26, 2018 (IN) .............................. 201841036390

(51) Int. Cl.
*G06F 9/48* (2006.01)
*G06F 9/54* (2006.01)
*G06F 3/06* (2006.01)
*G06F 16/23* (2019.01)

(52) U.S. Cl.
CPC .......... *G06F 9/4881* (2013.01); *G06F 3/0604* (2013.01); *G06F 3/0659* (2013.01); *G06F 3/0673* (2013.01); *G06F 9/542* (2013.01); *G06F 16/2379* (2019.01)

(58) Field of Classification Search
CPC .................................................. G06F 9/4881
See application file for complete search history.

(56) References Cited

U.S. PATENT DOCUMENTS 9,229,952 B1 1/2016 Meacham et al.
10,042,956 B2 8/2018 Vadapandeshwara et al.
(Continued)

OTHER PUBLICATIONS

Apache Spark Financial Analytics, Locus IT Services Pvt. Ltd, Available online at: https://locusit.com/financial-services-analytics/apache-spark-financial-analytics/, Accessed from Internet at Feb. 15, 2019, 2 pages.
(Continued)

*Primary Examiner* — Charlie Sun
(74) *Attorney, Agent, or Firm* — Kilpatrick Townsend & Stockton LLP

(57) ABSTRACT

Techniques for retaining in-memory dataframes beyond an in-memory processing session. One technique includes receiving a request to execute a first run having a first set of tasks, creating a first session to execute the first run, and executing the first run in the first session using a dataframe constructed for a dataset defined as a component of the first run. The executing the first run generates an updated dataframe. The technique further includes receiving a request to execute a second run having a second set of tasks. A dependency exists between the first run and the second run based on a condition that the dataset is defined as a component of the first run and the second run. The technique further includes creating a second session to execute the second run, and executing the second run in the second session using the updated dataframe for the dataset.

20 Claims, 7 Drawing Sheets

(56) References Cited

U.S. PATENT DOCUMENTS

2013/0332931 A1* 12/2013 Malewicz ............... G06F 9/54
718/102
2019/0163553 A1* 5/2019 Ramegowda ....... G06F 11/0784

OTHER PUBLICATIONS

Cultivating Customer Relationships: Big Data in Financial Services, Datameer, Available online at: www.datameer.com/product/industries-use-cases/financial-services/, 2016, 9 pages.
RDD Caching and Persistence, Caching and Persistence • Mastering Apache Spark, Available online at: https://jaceklaskowski.gitbooks.io/mastering-apache-spark/spark-rdd-cac . . . , Accessed from Internet at Feb. 15, 2019, 1 page.
Top 5 Apache Spark Use Cases, Available online at: https://www.dezyre.com/article/top-5-apache-spark-use-cases/271, Accessed from Internet at Feb. 15, 2019, 6 pages.
Suneetha, Big Data Management Using Apache Spark: Analysis of Bank Customer s who Are Interested to Maintain an Account Based on Their Age Group, Journal of Computer Science & Systems Biology, Available online at: https://www.omicsonline.org/proceedings/big-data-management-using-apache-spark-analysis-of-bank-customer-s-who-are-interested-to-maintain-an-account-based-on-their-age-gr-96145.html, Accessed from Internet at Feb. 15, 2019, 1 page.

* cited by examiner

RE-USING DATA STRUCTURES BEYOND THE LIFE OF AN IN-MEMORY PROCESSING SESSION

REFERENCE TO RELATED APPLICATIONS

The present application claims the benefit and priority of India Provisional Application No. 201841036390, filed Sep. 26, 2018, the entire contents of which are incorporated herein by reference for all purposes.

FIELD OF THE INVENTION

The present disclosure relates generally to business intelligence, and more particularly, to techniques for solving complex and time-sensitive business scenarios using in-memory processing including incremental or delta processing for dependent compute updates.

BACKGROUND

Business intelligence represents the tools and systems that play a key role in the strategic planning process within a corporation. These business intelligence systems are designed with the primary goal of extracting important data from an organization's raw data to reveal insights to help a business make faster and more accurate decisions. The software typically integrates data from across the enterprise and provides end-users with self-service reporting and analysis. Conventional business intelligence systems have been based on disk storage mechanisms. Disk storage mechanisms typically load data onto a computer's hard disk in the form of multiple tables and multi-dimensional structures against which queries are run. Disk-based storage mechanisms include relational database management systems (RDMS), often based on the structured query language (SQL), such as SQL Server, MySQL, Oracle Database and many others. RDMS are designed for the requirements of transactional processing. However, using a database that supports insertions and updates as well as performing aggregations, joins (typical in business intelligence solutions) are typically very slow. Specifically, reading data from a hard disk is much slower (possibly hundreds of times) when compared to reading the same data when the data is placed in-memory such as in random-access memory (RAM) or flash memory. Accordingly, in-memory processing is a technique that has developed for processing data stored in an in-memory database that allows data to be analyzed in real time, enabling faster reporting and decision-making in business.

In-memory processing can be accomplished via a distributed computing framework such as Apache Spark that includes large datasets stored in-memory across clusters of computing devices. With in-memory data storage, all information is initially loaded into system memory such as RAM or flash memory instead of hard disks. This allows large amounts of data to be stored in the same physical space, reducing the amount of memory needed to perform a query and increasing processing speed. Users directly query the data loaded into the system memory, thereby avoiding slower database access and performance bottlenecks. This differs from caching, a very widely used method to speed up query performance, in that caches are subsets of very specific pre-defined organized data. With in-memory tools, data available for analysis can be as large as a data mart or small data warehouse, which is entirely in-memory. This can be accessed quickly by multiple concurrent users or applications at a detailed level and offers the potential for enhanced analytics and for scaling and increasing the speed of an application. Theoretically, the improvement in data access speed for in-memory processing is 10,000 to 1,000,000 times compared to the disk. In-memory processing also minimizes the need for performance tuning by developers and provides faster service for end users.

BRIEF SUMMARY

Techniques are provided (e.g., a method, a system, non-transitory computer-readable medium storing code or instructions executable by one or more processors) for retaining in-memory data-frames beyond an in-memory processing session, making them available across sessions, writing the data-frames asynchronously to the disk, and handling the execution of runs based on update events to dependent datasets.

In various embodiments, a method is provided that comprises: receiving, by a data processing system, a request to execute a first run comprising a first set of tasks; creating, by a data processing system, a first session to execute the first run; executing, by the data processing system, the first run in the first session, where the execution of the first run comprises: identifying a task of the first set of tasks as requiring use of a dataset, obtaining a dataframe for the dataset, processing the task of the first set of tasks using the dataframe, and generating an updated dataframe based on the processing of the task; receiving, by the data processing system, a request to execute a second run comprising a second set of tasks, where a dependency exists between the first run and the second run based on a requirement that the first run and the second run use the same dataset; creating, by the data processing system, a second session to execute the second run; and executing, by the data processing system, the second run in the second session, where the execution of the second run comprises: identifying a task of the second set of tasks as requiring use of the same dataset, loading the updated dataframe for the same dataset, and processing the task of the second set of tasks using the updated dataframe.

In some embodiments, the execution of the first run further comprises: identifying the dataset as being required to execute both the first run and the second run based on parameters received in the request to execute the first run, where the dataset requirement establishes the dependency between the first run and the second run; checking a map to determine whether the dataframe is present in a memory store based on the dataset requirement; when the dataframe is present in the memory store, loading the dataframe from the memory store; and when the dataframe is not present in the memory store, creating the dataframe for the dataset.

In some embodiments, the execution of the first run further comprises: identifying the dataset as being required to execute both the first run and the second run based on parameters received in the request to execute the first run, where the dataset requirement establishes the dependency between the first run and the second run; and updating the dataframe in a memory store with the updated dataframe based on the dataset requirement, and where during the execution of the second run, the updated dataframe for the same dataset is loaded from the memory store.

In some embodiments, the method further comprises: upon updating the dataframe in the memory store with the updated dataframe, publishing, by the data processing system, a message to a topic of an event handler, where the message identifies the dataframe as being updated; and receiving, by the data processing system, a supplemental execution request to execute the second run using the update dataframe.

In some embodiments, when the execution of the second run has already begun, the second run is stopped and checkpoints are saved, the second run is then restarted and the updated dataframe is used to process any task identified as requiring use of the same dataset from the saved checkpoints until completion of the second run; and when the execution of the second run has not already begun, the supplemental execution request is incorporated into the request to execute the second run such that the updated dataframe is used to process any task identified through-out the run as requiring use of the same dataset.

In some embodiments, the message further identifies a location of the updated dataframe in the memory store, the supplemental execution request is received from a listener that is subscribed to the topic of the event handler, and the supplemental execution request includes the location of the updated dataframe in the memory store.

In some embodiments, the first run is defined by a rule run framework to include the parameters, and the parameters identify the first run and the second run as requiring use of the same dataset for processing one or more tasks.

In various embodiments, a non-transitory computer-readable memory is provided that stores a plurality of instructions executable by one or more processors, the plurality of instructions comprising instructions that when executed by the one or more processors cause the one or more processors to perform processing comprising: receiving a request to execute a first run comprising a first set of tasks; creating a first session to execute the first run; executing the first run in the first session, where the execution of the first run comprises: identifying a task of the first set of tasks as requiring use of a dataset, obtaining a dataframe for the dataset, processing the task of the first set of tasks using the dataframe, and generating an updated dataframe based on the processing of the task; receiving a request to execute a second run comprising a second set of tasks, where a dependency exists between the first run and the second run based on a requirement that the first run and the second run use the same dataset; creating a second session to execute the second run; and executing the second run in the second session, where the execution of the second run comprises: identifying a task of the second set of tasks as requiring use of the same dataset, loading the updated dataframe for the same dataset, and processing the task of the second set of tasks using the updated dataframe.

In some embodiments, the execution of the first run further comprises: identifying the dataset as being required to execute both the first run and the second run based on parameters received in the request to execute the first run, where the dataset requirement establishes the dependency between the first run and the second run; checking a map to determine whether the dataframe is present in a memory store based on the dataset requirement; when the dataframe is present in the memory store, loading the dataframe from the memory store; and when the dataframe is not present in the memory store, creating the dataframe for the dataset.

In some embodiments, the execution of the first run further comprises: identifying the dataset as being required to execute both the first run and the second run based on parameters received in the request to execute the first run, where the dataset requirement establishes the dependency between the first run and the second run; and updating the dataframe in a memory store with the updated dataframe based on the dataset requirement, and where during the execution of the second run, the updated dataframe for the same dataset is loaded from the memory store.

In some embodiments, the plurality of instructions further comprises instructions that when executed by the one or more processors cause the one or more processors to perform processing comprising: upon updating the dataframe in the memory store with the updated dataframe, publishing, by the data processing system, a message to a topic of an event handler, where the message identifies the dataframe as being updated; and receiving, by the data processing system, a supplemental execution request to execute the second run using the update dataframe.

In some embodiments, when the execution of the second run has already begun, the second run is stopped and checkpoints are saved, the second run is then restarted and the updated dataframe is used to process any task identified as requiring use of the same dataset from the saved checkpoints until completion of the second run; and when the execution of the second run has not already begun, the supplemental execution request is incorporated into the request to execute the second run such that the updated dataframe is used to process any task identified through-out the run as requiring use of the same dataset.

In some embodiments, the message further identifies a location of the updated dataframe in the memory store, the supplemental execution request is received from a listener that is subscribed to the topic of the event handler, and the supplemental execution request includes the location of the updated dataframe in the memory store.

In some embodiments, the first run is defined by a rule run framework to include the parameters, and the parameters identify the first run and the second run as requiring use of the same dataset for processing one or more tasks.

In various embodiments, a system is provided that comprises: one or more processors; a memory coupled to the one or more processors, the memory storing a plurality of instructions executable by the one or more processors, the plurality of instructions comprising instructions that when executed by the one or more processors cause the one or more processors to perform processing comprising: receiving a request to execute a first run comprising a first set of tasks; creating a first session to execute the first run; executing the first run in the first session, where the execution of the first run comprises: identifying a task of the first set of tasks as requiring use of a dataset, obtaining a dataframe for the dataset, processing the task of the first set of tasks using the dataframe, and generating an updated dataframe based on the processing of the task; receiving a request to execute a second run comprising a second set of tasks, where a dependency exists between the first run and the second run based on a requirement that the first run and the second run use the same dataset; creating a second session to execute the second run; and executing the second run in the second session, where the execution of the second run comprises: identifying a task of the second set of tasks as requiring use of the same dataset, loading the updated dataframe for the same dataset, and processing the task of the second set of tasks using the updated dataframe.

In some embodiments, the execution of the first run further comprises: identifying the dataset as being required to execute both the first run and the second run based on parameters received in the request to execute the first run, where the dataset requirement establishes the dependency between the first run and the second run; checking a map to determine whether the dataframe is present in a memory store based on the dataset requirement; when the dataframe is present in the memory store, loading the dataframe from the memory store; and when the dataframe is not present in the memory store, creating the dataframe for the dataset.

In some embodiments, the execution of the first run further comprises: identifying the dataset as being required to execute both the first run and the second run based on parameters received in the request to execute the first run, where the dataset requirement establishes the dependency between the first run and the second run; and updating the dataframe in a memory store with the updated dataframe based on the dataset requirement, and where during the execution of the second run, the updated dataframe for the same dataset is loaded from the memory store.

In some embodiments, the plurality of instructions further comprises instructions that when executed by the one or more processors cause the one or more processors to perform processing comprising: upon updating the dataframe in the memory store with the updated dataframe, publishing, by the data processing system, a message to a topic of an event handler, where the message identifies the dataframe as being updated; and receiving, by the data processing system, a supplemental execution request to execute the second run using the update dataframe.

In some embodiments, when the execution of the second run has already begun, the second run is stopped and checkpoints are saved, the second run is then restarted and the updated dataframe is used to process any task identified as requiring use of the same dataset from the saved checkpoints until completion of the second run; and when the execution of the second run has not already begun, the supplemental execution request is incorporated into the request to execute the second run such that the updated dataframe is used to process any task identified through-out the run as requiring use of the same dataset.

In some embodiments, the message further identifies a location of the updated dataframe in the memory store, the supplemental execution request is received from a listener that is subscribed to the topic of the event handler, and the supplemental execution request includes the location of the updated dataframe in the memory store.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Overview of a Business Intelligence System

Enterprises such as financial institutions require constant monitoring and measurement of risk in order to conform to prevalent regulatory and supervisory standards. Such measurement often entails significant computations and validations with an organization's data. Data should be transformed to support such measurements and calculations. The processing involved in the transformation of data includes large volumes of time-period data and whose processing methodology is described as a series of tasks that perform data transformations and actions (including inserts/updates of computed values), which may be achieved through a set of defined rules in a Rule Run Framework. A run is an orchestration of series of transformations and actions stitched together with 'solve-order' among them. These tasks are grouped or sub-grouped and typically, these groups or sub-groups operate on common datasets. In some instances, datasets may also be reused across groups and even across runs.

Figure 1:
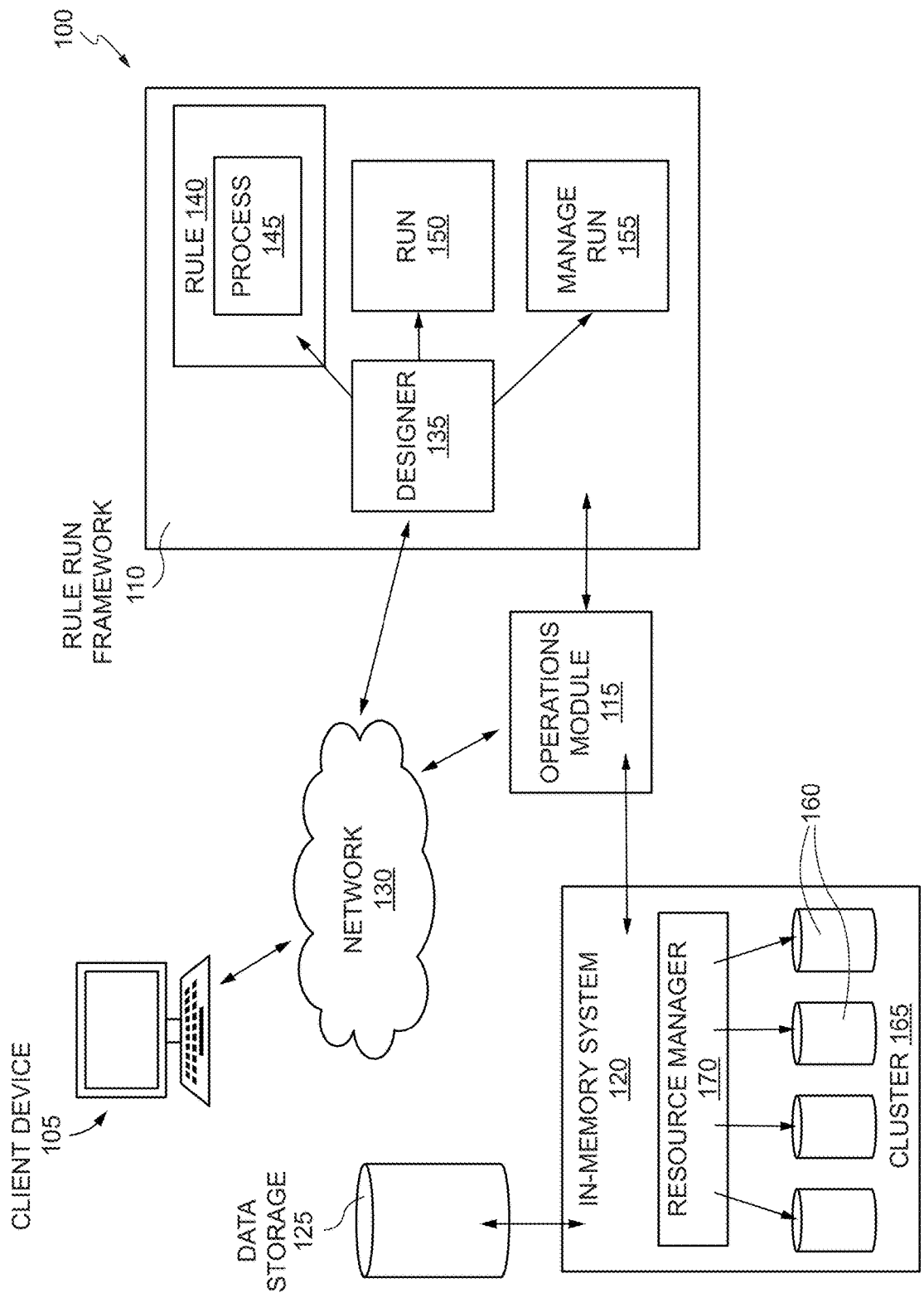
FIG. 1 is an illustration of a business intelligence system in accordance with various embodiments.

The various embodiments described herein may be used in an assortment of different domains and contexts. Certain embodiments are particularly applicable to enterprise application software provided in distributed computing technology. However, the systems and methods described herein may be used to provide data transformation functionality for any system or application framework that relies on an in-memory system for transforming data in a distributed environment Techniques (e.g., systems, methods, and machine-readable media) are disclosed to enable a business intelligence system to define a series of tasks as a run to perform data transformations using in-memory processing including incremental or delta processing for dependent compute updates. FIG. 1 shows a business intelligence system 100 comprising a client device 105, a rule run framework 110, an operations module 115, an in-memory computing system 120, and a data storage 125 (e.g., memory store) in accordance with various embodiments. A user operating client device 105 may be presented one or more interfaces (e.g., a graphical interface) that accept input to enable a user to interact with rule run framework 110. Examples of a client device 105 include, without restriction, a workstation, personal computer (PC), laptop computer, mobile device such as a smart phone, wearable computer, or other networked electronic device. The interface presented at the client device 105 may be accessible using an application executing on the client device 105. Some embodiments disclosed herein may be implemented by one or more communications from the client device 105 back and forth to the rule run framework 110 and the operations module 115. The client device 105, the rule run framework 110, and the operations module 115 may communicate via one or more communication networks 130. Examples of communication networks 130 may include a mobile network, a wireless network, a cellular network, a local area network (LAN), a wide area network (WAN), other wireless communication networks, or combinations thereof.

The rule run framework 110 facilitates a user to define and execute a set of rules, reporting objects, and processes that are required to transform data in the in-memory system 120. The rule run framework includes a designer module 135, a rule module 140, a process module 145, a run module 150, and a manage run module 155. The designer module 130 provides an interface that allows the user via, for example, the client device 105 to define and execute rules, processes, and to manage definitions within the rule run framework 105. For example, many entities such as financial institutions require constant monitoring and measurement of risk in order to conform to prevalent regulatory and supervisory standards. These measurement often entail significant computations and validations with an enterprise's data. The data is frequently transformed to support such measurements and calculations. These data transformation may be achieved through a set of defined rules.

The rules module 135 facilitates a user to define a set of rules, report objects, and processes that are implemented to transform data in a storage unit such part of in-memory system 115. For example, a rules option in the rule designer provides a framework that facilitates the definition and maintenance of a transformation. A metadata abstraction layer may be used in the definition of rules where the user is permitted to re-classify the attributes in the in-memory system 115 thus transforming the data. The underlying metadata objects such as hierarchies that are non-large or non-list, datasets and business processors drive the rule functionality. Rules may include various types. For example, a Type 1 rule may involve creating a subset of records from a given set of records in the data model based on certain filters. This process can involve transformations, aggregation, or a combination thereof. Type 1 rule definitions may be achieved through a Table-to-Table (T2T) Extract. Type 2 rules may involve re-classification of records in a table in a data model based on criteria that include complex Group By clauses & Sub Queries within the tables. Type 3 rules may involve computations of a new value or metric based on a simple measure and updating an identified set of records within the data model with the computed value. The designer module 130 includes of a set of tools, which help a user to work with the various rule definitions.

In various embodiments, the rules are defined to include one or more components. The components may include a dataset, a source, a target, a mapping, and/or node identifier. A dataset is a set of tables that are joined together by keys. A dataset may have at least one fact table. Fact tables store measurements, metrics or facts of a business process. A fact table may be located at the center of a star schema or a snowflake schema surrounded by dimension tables. Dimensions tables store reference data (e.g., a list of products, list of branches, list of geographies, list of currencies, etc., that an entity deals with are relatively static). Where multiple fact tables are used, these are arranged as a fact constellation schema. A fact table typically has two types of columns: those that contain facts and those that are a foreign key to dimension tables. The primary key of a fact table is usually a composite key that is made up of all of its foreign keys. Fact tables contain the content of the in-memory system 115 and store different types of measures like additive, non additive, and semi additive measures Type 3 rule definitions may be based on datasets that contain more than one fact table. Type 2 rule definitions must be based on datasets that contain a single fact table. The values in one or more columns of the fact tables within a dataset may be transformed with a new value.

The source determines the basis on which a record set within the dataset is classified. The classification may be driven by a combination of members of one or more hierarchies. A hierarchy may be based on a specific column of an underlying table in the data warehouse model. The table on which the hierarchy is defined should be a part of the dataset selected. One or more hierarchies may participate as a source so long as the underlying tables on which they are defined belong to the dataset selected. A target determines the column in the in-memory system 115 that will be impacted with an update. The target also encapsulates the business logic for the update. The identification of the business logic can vary depending on the type of rule that is being defined. The mapping operation classifies the final record set of the target that is to be updated into multiple sections. The mapping also encapsulates the update logic for each section. The logic for the update can vary depending on the hierarchy member or business processor used. The logic may be defined through the selection of members from an intersection of a combination of source members with target members. A node identifier is a property of a hierarchy member. In a rule definition the members of a hierarchy that cannot participate in a mapping operation are target members, whose node identifiers identify them to be an 'Others' node, 'Non-Leaf' node or those defined with a range expression. Source members, whose node identifiers identify them to be 'Non-Leaf' nodes, can also be mapped.

A set of rules collectively form a process. A process definition may be represented as a process tree. The process module 140 provides a framework that facilitates the definition and maintenance of a process. By defining a process, a user can logically group a collection of rules that pertain to a functional process. For example, a user can define a process with the existing metadata objects using a hierarchical structure, which facilitates the construction of a process tree. A process tree can have many levels and one or many nodes within each level. Sub-processes may be defined at level members and process hierarchy members form the leaf members of the tree. Processes may include two types: (i) an end to end process, which denotes functional completeness and is ready for execution, and (ii) non-end to end process, which is a logical collection of rules and cannot be executed by itself. The non-end to end process may be defined as a sub-process in an end-to-end process to be executed. The process module 140 provides a framework to facilitate a user to define a process. The process module 140 may be used to build a process tree by adding one or more members called process nodes. If there are predecessor tasks associated with any member, the tasks defined as predecessors precede the execution of that member.

The run module 145 provides a framework to facilitate a user to combine various components and/or processes together and execute them with different underlying approaches as one or more runs. The run nodule 145 may be used to build a run definition by adding one or more existing metadata objects or components. Further, run conditions and/or job conditions can be specified as parameters of the run or individual tasks of the run while defining a run. In some embodiments, run conditions and/or job conditions include performing operations such as data transformations with datasets that are shared amongst applications, groups or subsgroups of tasks, as described in further detail herein. Two types of runs may be defined namely a base run and a simulation run. A base run allows a user to combine different rules and processes together as jobs and apply run conditions and job conditions. A simulation run allows a user to compare the resultant performance or calculations with respect to the baseline runs by replacing an existing job with a simulation job (a job can be a rule or a process).

The run definitions created by the run module 145 results in a unique batch group. These batches could then be scheduled for execution in a manage run interface provided by the manage run module 150 on the designer module 130. Every request for execution of a run definition may become a batch in that batch group. The manage run module 145 enables a user to have a work flow for run execution. The predefined run definitions can be executed in a unique batch or batch group depending on the type of the manage run execution defined. These batches can then be executed from the operations module 155. For example, a user may select in the interface a run definition, which is to be marked for execution, and the name of the selected run definition appears in the run description textbox, displays details such as the Request Execution ID, Request Execution Description, Request Status, MIS Date, Execution Status, and Edit. The interface may have options to select batches that are defined for execution. The request status "open" indicates that the selected run id is ready for execution. The execution status "not started" indicates that the particular run definition/batch has not been executed in the batch group execution screen. A user can selected edit to edit a request for execution. A user can also make use of a search and filter option to search for specific runs based on Run Name, Run Execution Description, MIS Date, Run Execution ID, Type, or Request Status. A pagination option can help a user to manage the view of existing runs within the system.

The operation module 115 facilitates a user in administration and processing of data (e.g., enterprise data) to create the highest level of efficiency within the system and to derive results based on one or more specified rules. The operation module 115 may include sections such as Batch Maintenance, Batch Execution, Batch Scheduler, Batch Monitor, Batch Processing Report, Batch Cancellation, and View Log. The Batch Maintenance framework within the operation module 115 facilitates a user to create and maintain the batch definitions. The user can process the batch scheduled for execution from Batch Maintenance and also from other modules such as an Advanced Analytics Infrastructure (not shown) and the run rules framework 110. The Batch Execution refers to the process of initiating a batch for current processing. When a batch is submitted for execution, a series of commands are sent to the in-memory system 120 with respect to the defined components and parameters. This in turn returns an array of update counts (e.g., value definitions) when the commands are executed successfully. The Batch Scheduler in the operations module 115 facilitates a user to schedule a batch for later processing. The user can define a new batch schedule or update a previously defined batch schedule for processing. The Batch Monitor in the operations module 115 facilitates a user to view the status of executed batch definitions along with the tasks details. A user can track the issues if any, on regular intervals and ensure smoother batch execution. An event log provides the user the real time status of the executed batches. The Batch Processing Report in the operations module 115 facilitates a user to view the execution status of each task component defined in a batch. Batch Cancellation facilitates a user to cancel or abort a batch, or a specific task, which is either scheduled or is in the process of execution. The view log facilitates a user to view the execution status of each task component defined in a batch.

The in-memory system 120 such as Apache Spark-Hadoop with YARN, is a cluster-computing platform that provides an application programming interface (API) for distributed programming and is designed to be fast for interactive queries and iterative algorithms. The in-memory system 120 primarily achieves this by caching data required for computation in the memory of the nodes 160 in the cluster 165. The in-memory system 120 utilizes a resource manager 170 to allocate and manage cluster resources such as processors and memory. In-memory cluster computation enables the in-memory system 120 to run iterative algorithms, as programs can checkpoint data and refer back to it without reloading it from disk; in addition, in-memory system 120 supports interactive querying and streaming data analysis at extremely fast speeds. In some embodiments, in-memory system 120 keeps a dataset in-memory as much as possible throughout the course of the application, preventing the reloading of data between iterations. The programming therefore does not simply specify map and reduce steps, but rather an entire series of data flow transformations to be applied to the input data before performing some action that requires coordination like a reduction or a write to disk. Because data flows can be described using directed acyclic graphs (DAGs), the in-memory system 120 execution engine knows ahead of time how to distribute the computation across the cluster 165 and manages the details of the computation.

The in-memory system 120 provides reliable distributed computation through a framework called resilient distributed datasets (RDDs). The distributed computation provided by the in-memory system 120 improves the performance (speed) of a computation by breaking a large computation or task defined within a run into smaller, independent computations that can be processed simultaneously (in parallel) and then aggregated to a final result. Because each parallel computation is processes on an individual node 160 or computer in the cluster 165, a distributed computing framework provides consistency, correctness, and fault-tolerant guarantees for the whole computation. RDDs are a programming abstraction that represents a read-only collection of objects that are partitioned across a set of machines. RDDs can be rebuilt from a lineage (and are therefore fault tolerant), are accessed via parallel operations, can be read from and written to a distributed storage system such as an in-memory file system of data storage 125, and can be cached in the memory of worker nodes for immediate reuse. In some embodiments, the data storage 125 is a persistent storage (storage for permanent data). In other embodiments, the data storage 125 is a transient storage (storage for non-permanent data). In other embodiments, the data storage 125 is a combination of a persistent storage and a temporary storage. It is this in-memory caching feature that allows for massive speedups and provides for iterative computing required for machine learning and user-centric interactive analyses.

The RDDs may be operated upon with functional programming constructs that include and expand upon map and reduce. The programming within the in-memory system 120 may create new RDDs by loading data from an input source, or by transforming an existing collection to generate a new one. The history of applied transformations is primarily what defines the RDD's lineage, and because the collection is immutable (not directly modifiable), transformations can be reapplied to part or all of the collection in order to recover from failure. The in-memory stem 120 API is therefore a collection of operations that create, transform, and export RDDs. The fundamental programming model therefore is describing how RDDs are created and modified via programmatic operations. There are two types of operations that can be applied to RDDs: transformations and actions. Transformations are operations that are applied to an existing RDD to create a new RDD—for example, applying a filter operation on an RDD to generate a smaller RDD of filtered values. Actions, however, are operations that actually return a result back to the Spark driver program—resulting in a coordination or aggregation of all partitions in an RDD. In this model, a map function is a transformation, because a function is passed to every object stored in the RDD and the output of that function maps to a new RDD. On the other hand, an aggregation like reduce is an action, because reduce requires the RDD to be repartitioned (according to a key) and some aggregate value like sum or mean computed and returned. Most actions in the in-memory system 120 are designed solely for the purpose of output—to return a single value or a small list of values, or to write data back to the in-memory file system of the persistent data store 125.

Rule Run Framework Optimization with in-Memory Processing

Embodiments of the present disclosure provide techniques for processing runs using an in-memory processing system (e.g., in-memory system 120 described with respect to FIG. 1 such as Apache Spark) that is capable of reusing dataframes across groups or sub-groups of tasks and runs (e.g., across sessions). As used herein, a "session" is a time bounded interaction between two or more entities (e.g., an interaction between the operations module 115 and the in-memory system 120). Beyond a time-bounded interaction, a session provides a single point of entry to interact with underlying functionality and allows for execution and processing of a run (an orchestration of a series of transformations and actions). A session ends upon closure, which typically occurs upon completing the processing of a run.

An in-memory system is well suited for a wide variety of data processing workloads. In business intelligence, there is an opportunity to use the capability of an in-memory system to optimize the performance of existing frameworks such as the rule run framework used in batch bound applications that employ long running data processing (with 50 million+ records), in near real time and with workloads that are predominantly a series of data transformations including inserts of computed values. When optimizing the performance of the rule run framework, datasets (primarily fact tables) used as components for the rules may be converted to dataframes for processing by the in-memory system. As used herein, a "dataframe" is a distributed collection of data organized into named columns that provides operations such as filter, group, or compute aggregates. Dataframes may be constructed from structured datasets, data files, existing RDDs, tables, or external databases, and may be used with a structured query language. A dataframe is conceptually equivalent to a table in a relational database or a fact table in the rule run framework.

In a conventional in-memory system, datasets used as components of a run are converted to dataframes, the run is executed and processed using the dataframes, any output dataframes are converted to output datasets and forwarded to the rule run framework for reporting, and execution completion clears out the dataframes from memory of the in-memory system. However, in the rule run framework many of the datasets (e.g., fact tables) are reused across subject-areas (e.g., Application (A) (Asset-Liability Management) and Application (B) (Liquidity Risk Management)), and thus many of the dataframes constructed from the datasets may be reused across groups or subgroups of tasks or runs. For example, Application (A) and Application (B) may have different runs (executed in different sessions) but use substantially the same input datasets and thus input dataframes. Various scenarios may arise where a run (R1) for Application (A) and a run (R2) for Application (B) are concurrently running (e.g., running at a substantially same time), running serially (e.g., one after the other), or running at separate time points (e.g., running at an arbitrary point of time after the other). In any event, it should be understood that the computations performed in one or more tasks for run (R1) may result in updates (inserts in some cases) to one or more of the input dataframes. Therefore, the one or more of the output dataframes for run (R1) may include updates (e.g., a refreshed dataframe created post computation or execution), which makes the one or more input dataframes obsolete. Thereafter, if run (R2) executes a run using the one or more input dataframes, then run (R2) will essentially generate obsolete data. Thus, a challenge exists where there is a need for run (R1) to execute through completion without clearing out the updated dataframes created in run (R1) even though the in-memory session for run (R1) is to be closed. Moreover, conventional in-memory systems work on a concept of lazy loading, where the in-memory system will not load the dataframes until some action command is executed e.g., count ( ) show ( ) or save ( ). Thus, another potential challenge exists where there is need for persistence of dataframes on demand.

In order to overcome these challenges, various embodiments of the present disclosure provide techniques for: (i) maintaining dataframes across groups or sub-groups of tasks and runs (e.g., across sessions), and (ii) maintaining dependencies between applications, groups or subgroups of tasks, or runs such that a session for a dependent applications, groups or subgroups of tasks, or runs can be notified of an update event to a dataframe and implement the updated dataframe in its run. The implementation of the updated dataframe into a run may include executing the run from the start with the updated dataframe, incorporating the updated dataframe into one or more tasks of a run already started, or re-executing a run from the beginning with the updated dataframe. More specifically, aspects of the present technical solution provide a caching solution, which caches the dataframes after a run execution where the dataframes can be registered post update/refresh and mapped to the dataset from which they were created. Since keeping data in memory helps tasks avoid input/output latencies when working on the shared objects. The dataframes may be saved in the cache (e.g., an in-memory file system of a persistent data store) which would be used to persist the dataframes asynchronously hence avoiding the expensive intermediate write-backs, and thus aligning with in-memory lazy loading architecture. This can be accomplished silently without affecting performance of business analytics. The intermediate or event based write-back of dataframe updates to disk may be managed with an analytical application using the dataframe handle exposed by the caching agent.

Other aspects of the present technical solution provide a messaging solution, which registers dependent applications, groups or subgroups of tasks, or runs as subscribers, logs update events, and notifies subscribers of relevant update events. The update event may be managed and triggered through the event log. Any update to a source or input dataframe will result in an event getting generated. A listener will poll for events against a topic to which a subscriber (i.e., a dependent applications, groups or subgroups of tasks, or runs) has registered. On occurrence of a valid update event, the analytical application is notified by the listener via insertion of an execution request for the impacted run(s) and/or task(s) (assuming the impacted run(s) would be executing and update/write-back events have yet to happen). In the instance in which a run has not yet executed, the analytical application will execute the run in the normal course of events and load the updated dataframe for the impacted task(s) as they arise such that run from the start will be processed with the updated dataframe. In the instance in which the run is presently being processed, the run would be stopped and the checkpoints saved, and the run would be restarted from the checkpoints and the analytical application will load the updated dataframe for the impacted task(s) thereafter such that the remaining run from the checkpoints will be processed with the updated dataframe. In the instance in which the run is completed but prior to update/write-back events, the analytical application will re-execute the run and load the updated dataframe for the impacted task(s) as they arise such that run from the start will be processed with the updated dataframe.

Figure 2:
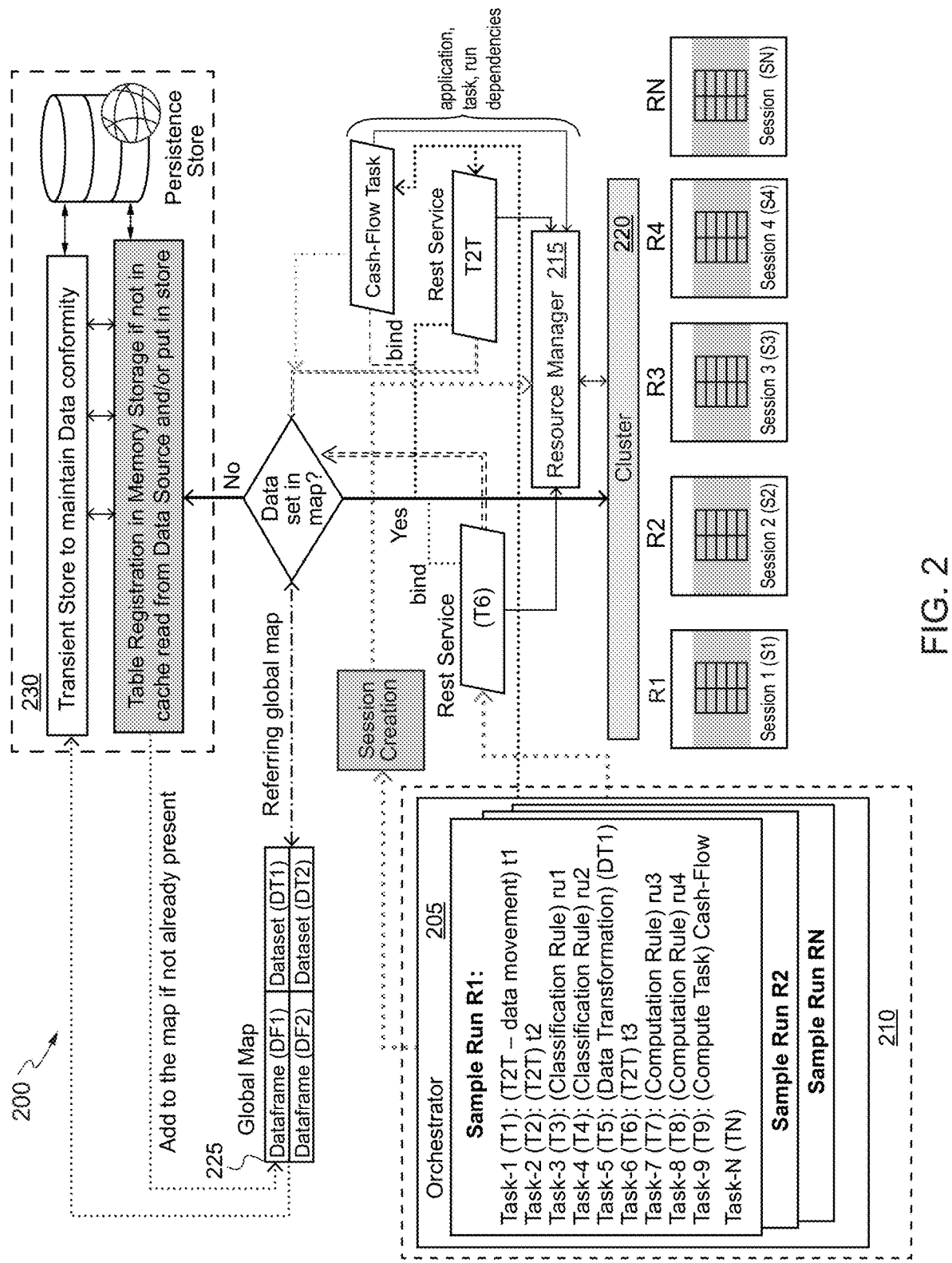
FIG. 2 is an illustration of a solution architecture for retaining in-memory data-frames beyond an in-memory processing session, making them available across sessions, writing the data-frames asynchronously to the disk and handling the execution of runs based on update events to dependent datasets in accordance with various embodiments.

FIG. 2 illustrates solution architecture 200 (e.g., a data processing system) for retaining in-memory data-frames beyond an in-memory processing session such that the dataframes are available across sessions, and handling the execution of runs based on update event(s) to dependent datasets. As shown, the architecture 200 includes an orchestrator 205 of an analytical application 210, a resource manager 215 and the cluster of nodes 220 (e.g., the resource manager 170 and the cluster of nodes 165 described with respect to the in-memory system 120 of FIG. 1), a map 225, and a cache layer 230 (e.g., an in-memory file system of a persistent data store and/or transient data store). The orchestrator 205 may be initiated for processing a run (R1) that includes at least one task (T5) that operates on a dataset (DT1). As described herein with respect to FIG. 1, the run (R1) comprising a batch of tasks (T1)-(T9) maybe defined using rule run framework 110 and the batch of tasks (T1)-(T9) maybe scheduled for processing using the operations module 115. In some embodiments, additional runs (R2)-(RN) comprising a batch of tasks (T1)-(TN) may be defined and batches of tasks (TA-TN) may be scheduled for processing. Once scheduled, the orchestrator 205 may create a session (S1) for in-memory processing of the run (R1). In some embodiments, the orchestrator 205 also creates additional sessions (S2)-(SN) for in-memory processing of the runs (R2)-(RN) in accordance with the batch scheduling presented by the operations module 115. The various tasks in the run (R1) may be executed in sequence using resource manager 215 and the cluster of nodes 220 until a task (T5) is identified comprising the use of a dataset (DT1) (e.g., a fact table). In some embodiments, the various tasks in the runs (R2)-(RN) may be held in state within sessions (S2)-(SN) and/or executed in sequence concurrently with (R1) using resource manager 215 and the cluster of nodes 220.

Once a task (T5) is identified as comprising the use of a dataset (DT1), the dataset (DT1) may be identified as either an independent dataset (DT1) or a dependent dataset (DT1) based on parameters received in a request to execute processing of run (R1). An independent dataset (DT1) is a dataset that is only used in a single application, group or subgroup of tasks, or run (e.g., is not used across in-memory sessions); whereas a dependent dataset is required to execute multiple (greater than 1) applications, groups or subgroups of tasks, or runs (e.g., used in-memory across sessions). The dataset requirement across multiple applications, groups or subgroups of tasks, or runs establishes a dependency between each of the applications, groups or subgroups of tasks, or runs (e.g., between run (R1) and run (R2). The parameters may be provided for each run as part of the administrative set-up as part of the rule rune framework and identify the one or more applications, groups or subgroups of tasks, or runs that use the same dataset (DT1). When a dataset is identified as being independent, the orchestrator 205 creates a dataframe (DF1) for the dataset (DT1), and the dataframe (DF1) may be uploaded into the cluster of nodes 220 using the resource manager 215 for processing of the corresponding task (T5). When a dataset is identified as being dependent, the orchestrator 205 executes a process to determine whether a dataframe (DF1) already exists within the architecture 200 for the dataset (DT1).

The process to determine whether a dataframe (DF1) already exists for the dataset (DT1) may include using a map 225 of datasets and dataframes. In some embodiments, the map 225 comprises datasets and dataframes in association with one another such that the orchestrator 205 can determine whether a given dataset (DT1) has an associated pre-existing dataframe (DF1). An example of a map 225 may be a hash table or data table. When the dataset (DT1) is in the map 225 (e.g., an identifier for the dataset (DT1) matches an identifier for a dataset (DT1) entry in the map 225), the map 225 is used to determine the associated dataframe (DF1) that already exists within the in-memory system for the dataset (DT1). In various embodiments, the determination of the dataframe (DF1) associated with the dataset (DT1) includes determining a location of storage for the dataframe (DF1) within a memory store such as a cache layer 230. For example, map 225 may include information (e.g., metadata, rows of data, or columns of data) that identifies a location of storage for the dataframe (DF1) within the cache layer 230. The cache layer 230 may then be accessed to obtain and upload the corresponding dataframe (DF1) into the cluster of nodes 220 using the resource manager 215 for processing of the corresponding task (T5). When the dataset (DT1) is not in the map 225, the orchestrator 205 creates a dataframe (DF1) for the dataset (DT1) and saves the dataframe (DF1) in the cache layer 230. Thereafter, the dataframe (DF1) may be uploaded into the cluster of nodes 220 using the resource manager 215 for processing of the corresponding task (T5).

Once the processing of the dataframe (DF1) is completed in task (T5), if the dataset (DT1) was identified as independent, the dataframe (DF1) remains within the cluster of nodes 220 for use in further processing, if necessary, within the same session or run (R1). Alternatively, once the processing of the dataframe (DF1) is completed in task (T5), if the dataset (DT1) was identified as dependent, the orchestrator 205 updates the dataframe (DF1) in the cache layer 230 for any subsequent processing (e.g., across sessions). The updating of the dataframe (DF1) may include saving the changes between the input dataframe (DF1) and the output dataframe (DF1) to the dataframe (DF1) in the cache layer 230 or overwriting the dataframe (DF1) in the cache layer 230 with the output dataframe (DF1).

In some embodiments, the orchestrator 205 may have a built-in eviction strategy to clean-up the cache layer 230 once dataframes are no longer is use (e.g., dependent dataframes are no longer in use when all sessions using the dataframes have closed). For example, the orchestrator 205 may make the decision to remove one or more dataframes from the cache layer 230 based on the parameters for the runs (identifies the runs using the one or more dataframes)

and whether the sessions for those runs are open or have closed. Alternatively, the orchestrator 205 may make the decision to remove one or more dataframes from the cache layer 230 based on a mechanism such as an expiration clock. For example, each data frame may have a counter associated with it that provides the time from last save or update in the cache layer 230, and upon the counter reaching an expiration time (user definable), the orchestrator 205 may make the decision to remove the dataframe from the cache layer 230.

Figure 3:
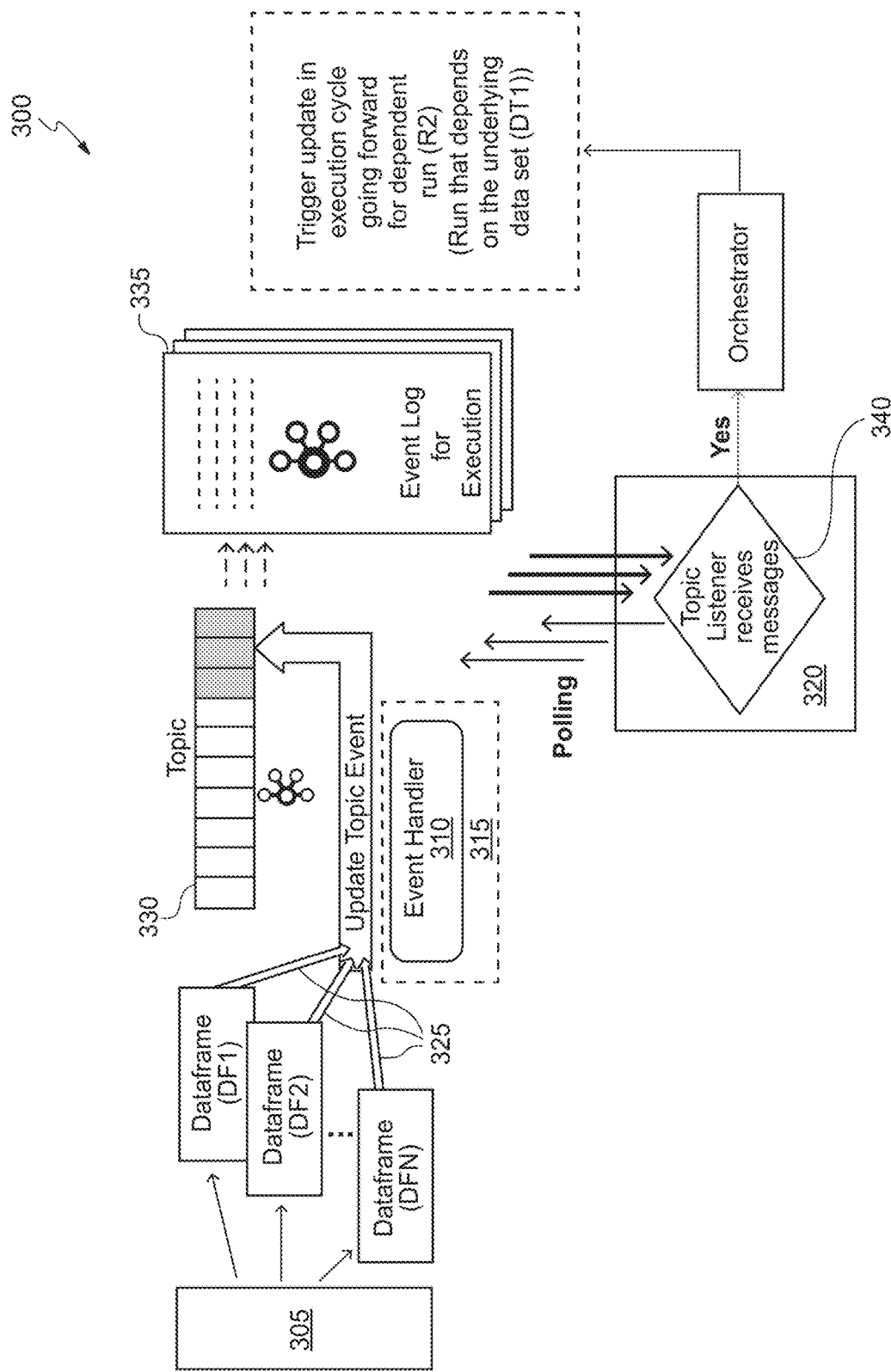
FIG. 3 illustrates a messaging service for handling the execution of runs based on update event(s) to dependent datasets within the solution architecture in accordance with various embodiments.

FIG. 3 illustrates a messaging service 300 for handling the execution of runs based on update event(s) to dependent datasets within the solution architecture 200. As shown, messaging service 300 includes producers 305, an event handler 310 of an analytical application 315 (e.g., the analytical application 210 discussed with respect to FIG. 2), and consumers 320. The producers 305 may be one or more of the orchestrator 205, the resource manager 215, and the cluster of nodes 220, as discussed with respect to FIG. 2. The producers 305 publish messages 325 for a topic 330. In some embodiments, the producers 305 publish messages 325 to the topic 330 via a producer API. In some embodiments, the messages 325 are information pertaining to updates to various dataframes (DF1)-(DFN). The topic 330 may be a log channel identified by a name and/or a unique identifier. There is no limit to the number of topics that can be present; however, in accordance with various aspects discussed herein, a primary publisher is the orchestrator 205 and a primary topic 330 is updated dataframes. In some embodiments, when the orchestrator 205 updates the dataframe (DF1), the orchestrator 205 sends a message 325 to the topic 330 identifying the dataframe (DF1) as being updated.

The event handler 310 may be a cluster of nodes, and each node is configured to receive messages 325 published for one or more topics 330. Each node of the event handler 310 reads and writes the messages 325 to event logs 335 configured for a given topic 330. In some embodiments, the messages 325 are written in sequence in one or more event logs 335. Like topics 330, there is no limit on the number of event logs 335 that may be present for each topic 330. Within each event log 335, each message 325 is assigned an index that identifies the message 325 (e.g., an incremental identifier).

The consumers 320 may include a listener 340 that subscribes to one or more topics 330 in the event handler 310. Once a consumer 320 subscribes to a topic 330, the event handler 310 offers the current index of the topic 330 to the consumer 320 and saves the index for future processing. The consumer 320 may poll the event handler 310 for new messages 325 published to a subscribed topic 330 (the polling may occur at arbitrary times or after a user assigned interval of time). Additionally or alternatively, the event handler 310 may forward new messages 325 published to a subscribed topic 330, as soon as they are written, to the consumer 320. Once the consumer 320 receives the new messages 325, the consumer 320 may process the messages 325 and send an acknowledgement back to the event handler 310. Upon receipt of the acknowledgment, the event handler 310 updates the current index of the topic 330 for the consumer 320 and saves the updated index for future processing.

In various embodiments, processing the messages 325, by the consumer 320, may include: (i) identifying the occurrence of a valid update event in one or more messages, (ii) determining the dataframe (DF1) that has been updated in the valid update event (and optionally the location of the dataframe DF1 in the cache layer), (iii) determining one or more runs and/or tasks that could be impacted by the update to the dataframe (DF1) based on the parameters of runs and/or tasks, and (iv) defining a supplemental execution request for the impacted one or more runs and/or task, where the supplemental execution request includes the use of the update dataframe (DF1). On occurrence of a valid update event, the orchestrator 205 is notified by the listener 340 via insertion of the supplemental execution request for the impacted run(s) and/or tasks(s) (assuming the impacted run(s) and/or tasks(s) would be executing and update/write-back events have not yet happened closing the session). In the instance in which an impacted run (R2) has not yet executed, the orchestrator 205 will execute the run (R2) in the normal course of events and the supplemental execution request is incorporated into the request to execute the run (R2) such that the updated dataframe (DF1) is used to process any task identified through-out the run (R2) as requiring use of the same dataset. In the instance in which an impacted run (R2) has already begun (is currently in the course of processing), the run (R2) is stopped and checkpoints are saved, the run (R2) is then restarted and the updated dataframe (DF1) is used to process any task identified as requiring use of the same dataset from the saved checkpoints until completion of the run (R2).

Figure 4:
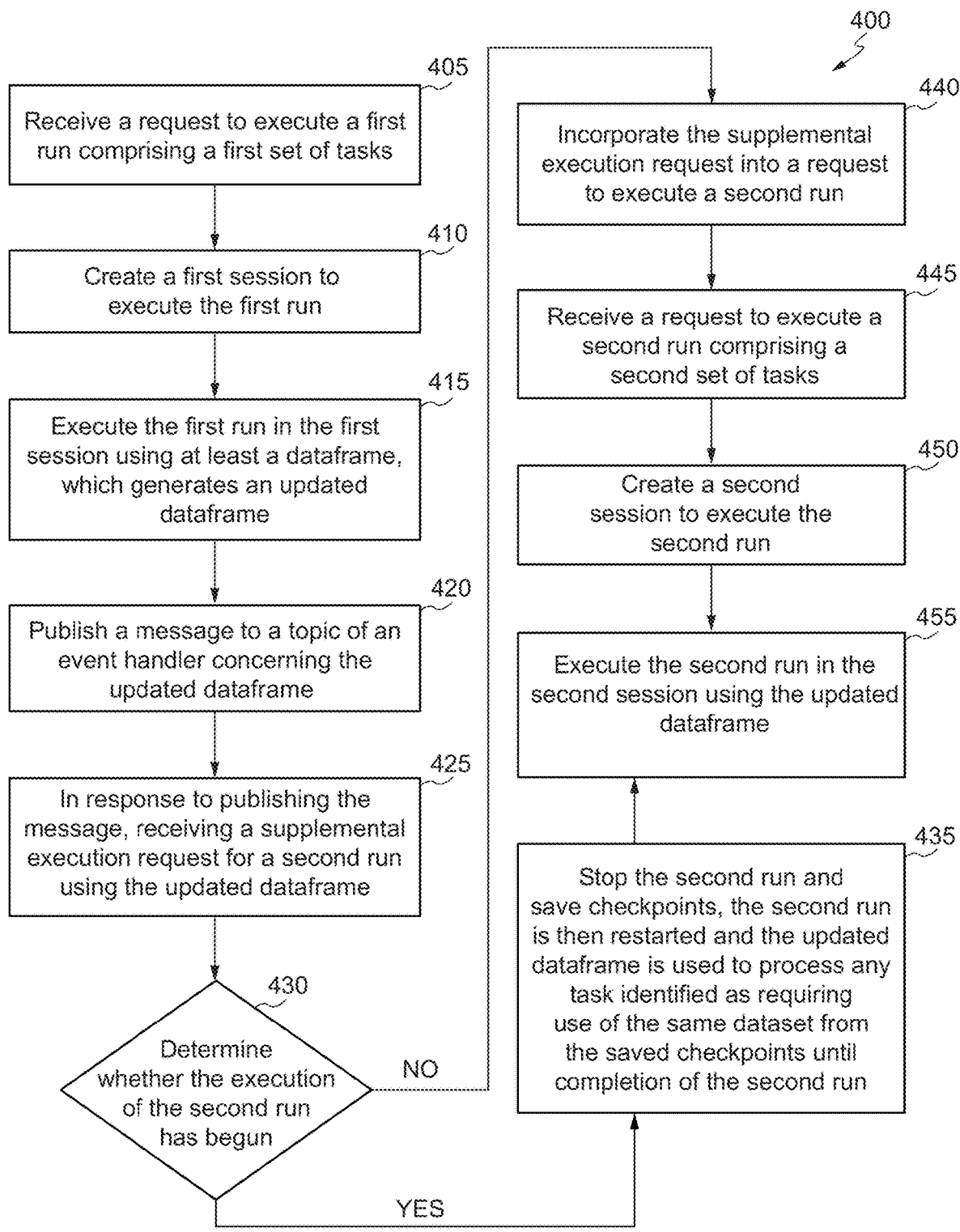
FIG. 4 depicts a flowchart illustrating a process for retaining in-memory data-frames beyond an in-memory processing session in accordance with various embodiments.

FIG. 4 is a simplified flowchart 400 illustrating an example of processing for monitoring, analyzing, visualizing, and improving the performance of a bot system according to certain embodiments. The processing depicted in FIG. 4 may be performed by one or more of a rule run framework, a solution architecture, and a messaging service, such as the rule run framework, the solution architecture, and the messaging service described with respect to FIGS. 1-3. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in a different order or some steps may also be performed in parallel.

At block 405, a request is received to execute a first run comprising a first set of tasks. In some embodiments, the first run is defined by a rule run framework to include parameters, and the parameters identify the first run and a second run as requiring use of a same dataset for processing one or more tasks. In some embodiments, the request is received by an orchestrator of a data processing system, for example, as described with respect to FIG. 2. At block 410, a first session is created to execute the first run. In some embodiments, the orchestrator creates the first session for an in-memory system of the data processing system, as described with respect to FIGS. 1 and 2. For example, the first session may be an in-memory session for processing the first set of tasks on a cluster of nodes. The first session allows for execution and processing of the first run (an orchestration of a series of transformations and actions defined for the first set of tasks). The first session ends upon closure, which occurs upon completing the processing of the first run.

At block 415, the first run is executed in the first session. In some embodiments, the orchestrator of the data processing system initiates execution of the first run in the first session. In some embodiments, the execution of the first run comprises: (i) identifying a task of the first set of tasks as requiring use of a dataset, (ii) obtaining a dataframe for the dataset, (iii) processing the task of the first set of tasks using the dataframe, and (iv) generating an updated dataframe based on the processing of the task. The dataframe may be constructed from structured datasets, data files, existing RDDs, tables, or external databases, and may be used with a structured query language. In some embodiments, the dataset is a fact table in the rule run framework and the dataframe is constructed from the fact table.

In various embodiments, the execution of the first run further comprises: (v) identifying the dataset as being required to execute both the first run and the second run based on the parameters received in the request to execute the first run. This dataset requirement establishes the dependency between the first run and the second run. In some embodiments, the execution of the first run further comprises: (vi) checking a map to determine whether the dataframe is present in a memory store based on the dataset requirement; (vii) when the dataframe is present in the memory store, loading the dataframe from the memory store; and (viii) when the dataframe is not present in the memory store, creating the dataframe for the dataset. In additional or alternative embodiments, the execution of the first run further comprises: (ix) updating the dataframe in a memory store with the updated dataframe based on the dataset requirement, and (x) during the execution of the second run, the updated dataframe for the same dataset is loaded from the memory store.

At block 420, upon updating the dataframe in the memory store with the updated dataframe, publishing a message to a topic of an event handler. The message identifies the dataframe as being updated. Optionally, the message further identifies a location of the updated dataframe in the memory store. In some embodiments, the message is published by one or more of the orchestrator, the resource manager, and the cluster of nodes. At block 425, a supplemental execution request is received to execute the second run using the update dataframe. In some embodiments, the supplemental execution request is received by the orchestrator of the data processing system from a listener that is subscribed to the topic of the event handler. In some embodiments, the listener generates the supplemental execution request to include the location of the updated dataframe in the memory store.

At step 430, upon receiving the supplemental execution request to execute the second run using the update dataframe, determining whether the execution of the second run has begun. In some embodiments, the determination of whether the execution of the second run has begun is made by the orchestrator. At block 435, when the execution of the second run has already begun, the second run is stopped and checkpoints are saved, the second run is then restarted and the updated dataframe is used to process any task identified as requiring use of the same dataset from the saved checkpoints until completion of the second run. At block 440, when the execution of the second run has not already begun, the supplemental execution request is incorporated into the request to execute the second run such that the updated dataframe is used to process any task identified through-out the run as requiring use of the same dataset.

At block 445, a request is received to execute a second run comprising a second set of tasks. A dependency exists between the first run and the second run based on the requirement that the first run and the second run use the same dataset. The request to execute the second run may be received before, concurrently, or after the request to execute the first run. In some embodiments, the second run is defined by a rule run framework to include parameters, and the parameters identify the first run and a second run as requiring use of a same dataset for processing one or more tasks. In some embodiments, the request is received by the orchestrator of the data processing system. At block 450, a second session is created to execute the second run. In some embodiments, the orchestrator creates the second session for an in-memory system of the data processing system. For example, the second session may be an in-memory session for processing the second set tasks on a cluster of nodes. The second session allows for execution and processing of the second run (an orchestration of a series of transformations and actions defined for the second set of tasks). The second session ends upon closure, which occurs upon completing the processing of the second run.

At block 455, the second run is executed in the second session. In some embodiments, the orchestrator of the data processing system initiates execution of the second run in the second session. In some embodiments, the execution of the second run comprises: (i) identifying a task of the second set of tasks as requiring use of the same dataset, (ii) loading the updated dataframe for the same dataset, and (iii) processing the task of the second set of tasks using the updated dataframe. The updated dataframe may be loaded from the memory store. In some embodiments, the execution of the second run further comprises: (iv) generating another updated dataframe based on the processing of the task (the updated dataframe is further updated, and may be used subsequently by other tasks or runs in a similar process as described with the initial update to the dataframe).

Illustrative Systems

Figure 5:
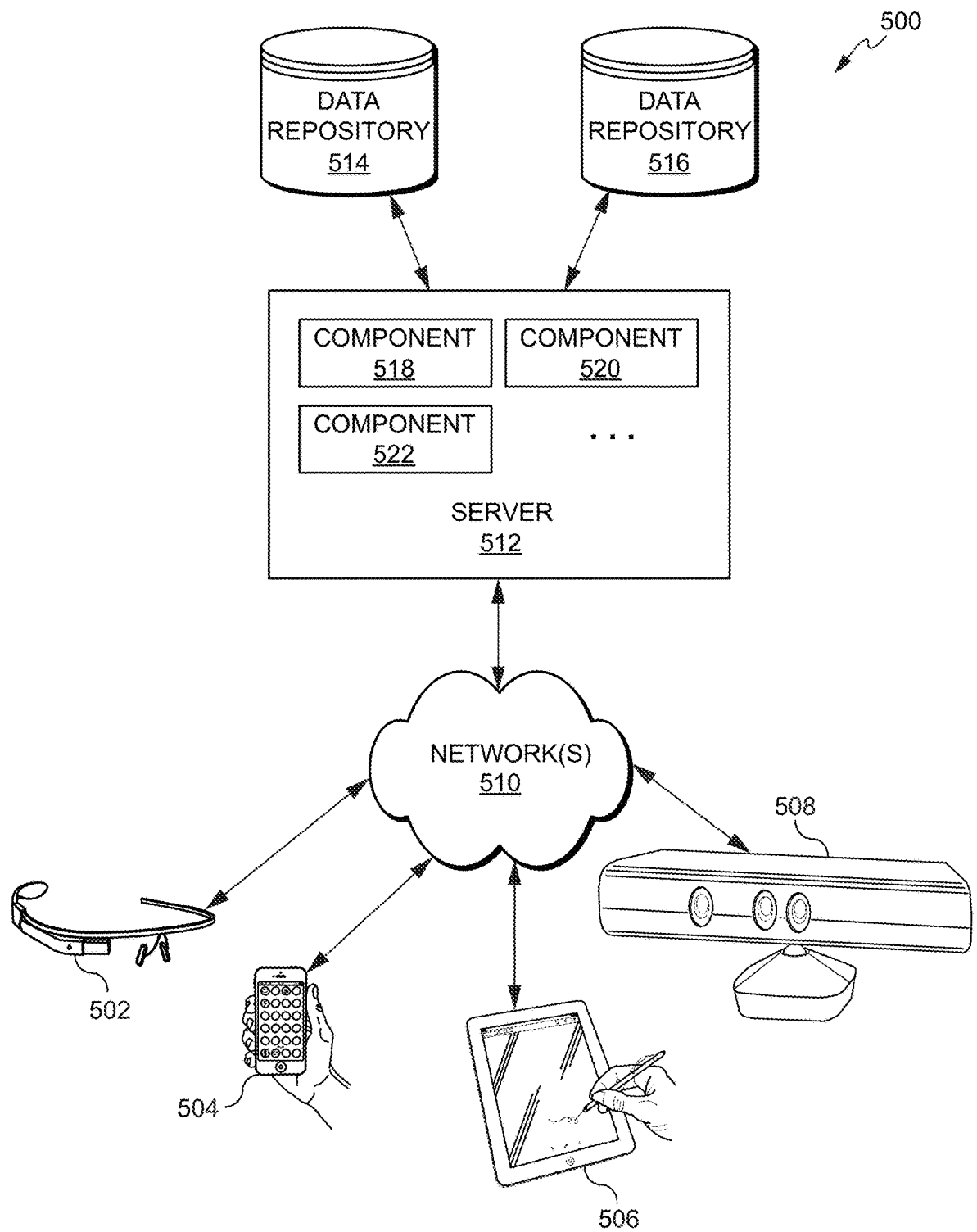
FIG. 5 depicts a simplified diagram of a distributed system for implementing various embodiments.

FIG. 5 depicts a simplified diagram of a distributed system 500 for implementing an embodiment. In the illustrated embodiment, distributed system 500 includes one or more client computing devices 502, 504, 506, and 508, coupled to a server 512 via one or more communication networks 510. Clients computing devices 502, 504, 506, and 508 may be configured to execute one or more applications.

In various embodiments, server 512 may be adapted to run one or more services or software applications that enable solving complex and time-sensitive business scenarios using in-memory processing.

In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to solve complex and time-sensitive business scenarios using in-memory processing in accordance with the teachings of this disclosure. A client device may provide an interface that enables a user of the client device to interact with the client device. The client device may also output information to the user via this interface. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®, tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization such as one or more flexible pools of logical storage devices that can be virtualized to maintain virtual storage devices for the server. In various embodiments, server 512 may be adapted to run one or more services or software applications that provide the functionality described in the foregoing disclosure.

The computing systems in server 512 may run one or more operating systems including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514, 516. These data repositories may be used to store data and other information in certain embodiments. For example, one or more of the data repositories 514, 516 may be used to store information for solving complex and time-sensitive business scenarios using in-memory processing. Data repositories 514, 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 514, 516 may also be used by applications to store application data. The data repositories used by applications may be of different types such as, for example, a key-value store repository, an object store repository, or a general storage repository supported by a file system.

Figure 6:
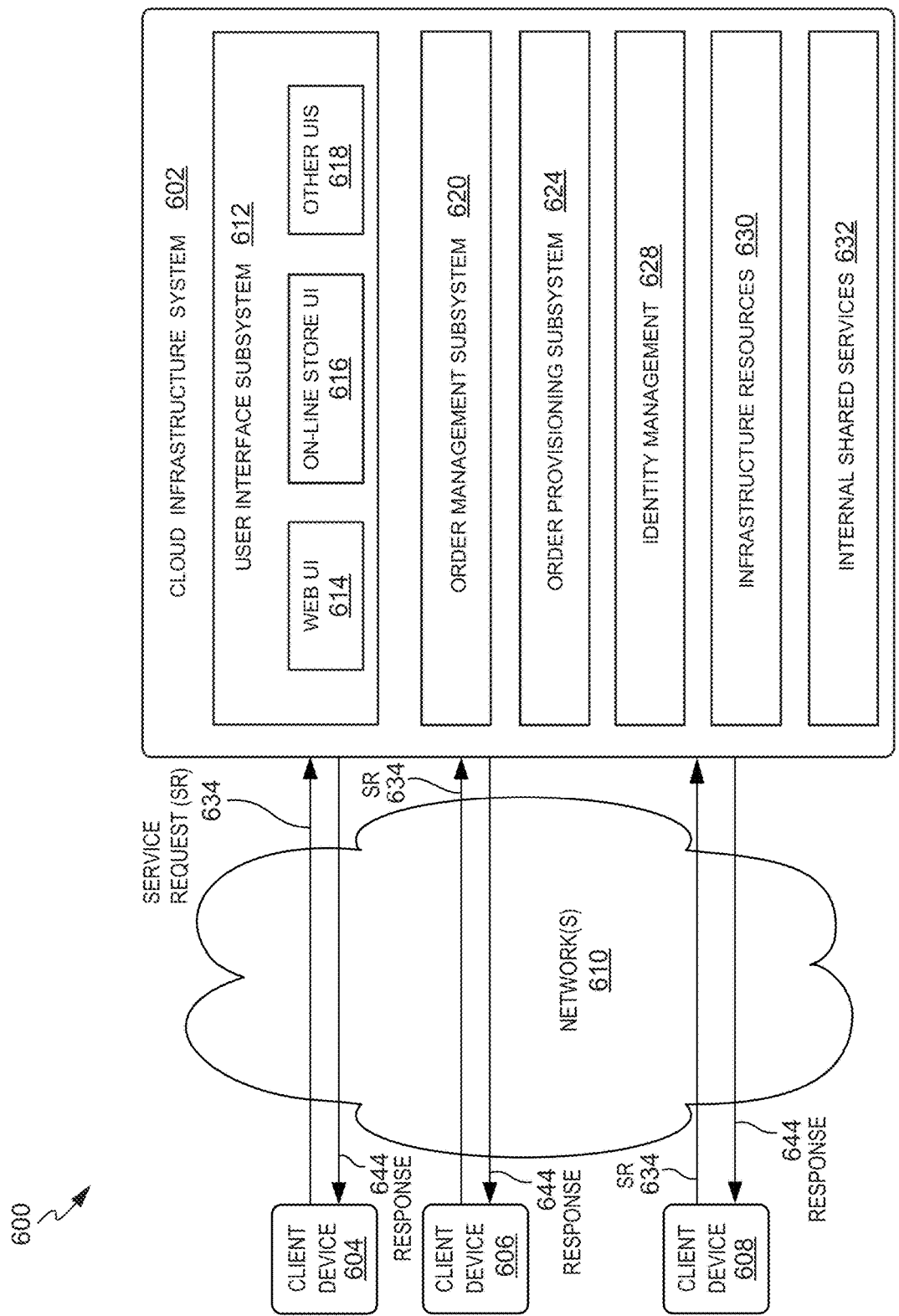
FIG. 6 is a simplified block diagram of one or more components of a system environment by which services provided by one or more components of an embodiment system may be offered as cloud services, in accordance with various embodiments.

In certain embodiments, the solving of complex and time-sensitive business scenarios using in-memory processing functionalities described in this disclosure may be offered as services via a cloud environment. FIG. 6 is a simplified block diagram of a cloud-based system environment in which the solving of complex and time-sensitive business scenarios using in-memory processing may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services requested in the customer's subscription order. For example, solving complex and time-sensitive business scenarios using in-memory processing. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602. For example, a user may use a client device to request in-memory processing service described in this disclosure.

In some embodiments, the processing performed by cloud infrastructure system 602 for providing business intelligent services may involve big data analysis. This analysis may involve using, analyzing, and manipulating large datasets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for solving complex and time-sensitive business scenarios using in-memory processing. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to. For example, a customer may place a subscription order for a business intelligent related service offered by cloud infrastructure system 602. As part of the order, the customer may provide information identifying complex and time-sensitive business scenarios to be solved.

In certain embodiments, such as the embodiment depicted in FIG. 6, cloud infrastructure system 602 may comprise an order management subsystem (OMS) 620 that is configured to process the new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services. In certain embodiments, for a customer requesting business intelligence service, the response may include a request for complex and time-sensitive business scenarios to be solved.

Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
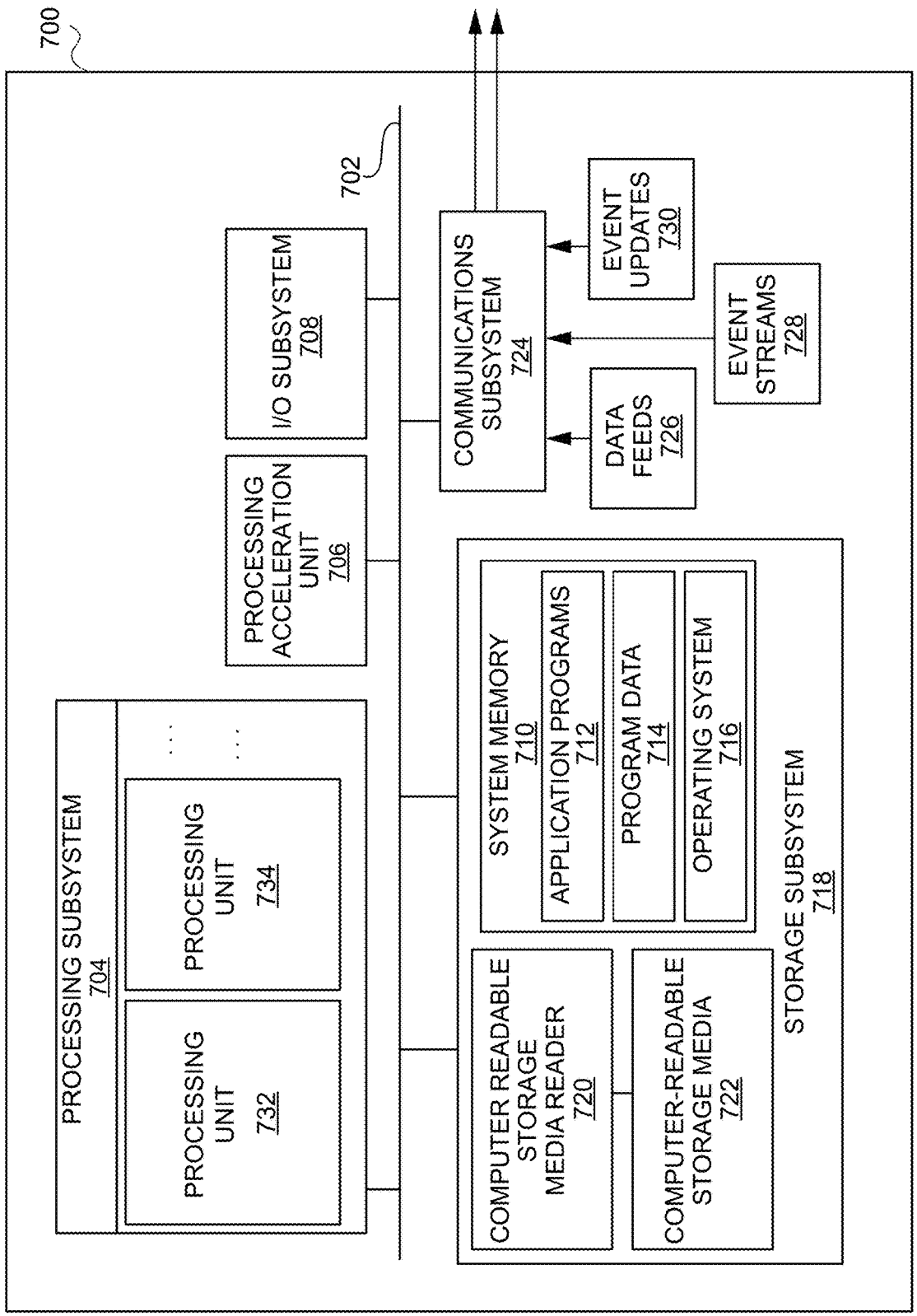
FIG. 7 illustrates an example computer system that may be used to implement various embodiments.

FIG. 7 illustrates an exemplary computer system 700 that may be used to implement certain embodiments. For example, in some embodiments, computer system 700 may be used to implement any of the in-memory processing systems, business intelligence systems, and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®). Additionally, user interface input devices may include voice recognition sensing devices that enable users to interact with voice recognition systems (e.g., Sin® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communication subsystem may be used to obtain table of data for in-memory processing.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, by a data processing system, a request to execute a first run comprising a first set of tasks;
   creating, by a data processing system, a first session to execute the first run;
   executing, by the data processing system, the first run in the first session, wherein the execution of the first run comprises: identifying a task of the first set of tasks as requiring use of a dataset, obtaining a dataframe for the dataset, processing the task of the first set of tasks using the dataframe, and generating an updated dataframe based on the processing of the task;
   receiving, by the data processing system, a request to execute a second run comprising a second set of tasks, wherein a dependency exists between the first run and the second run based on a requirement that the first run and the second run use the same dataset;
   creating, by the data processing system, a second session to execute the second run; and
   executing, by the data processing system, the second run in the second session, wherein the execution of the second run comprises: identifying a task of the second set of tasks as requiring use of the same dataset, loading the updated dataframe for the same dataset, and processing the task of the second set of tasks using the updated dataframe.

2. The method of claim 1, wherein the execution of the first run further comprises:
   identifying the dataset as being required to execute both the first run and the second run based on parameters received in the request to execute the first run, wherein the dataset requirement establishes the dependency between the first run and the second run;
   checking a map to determine whether the dataframe is present in a memory store based on the dataset requirement;
   when the dataframe is present in the memory store, loading the dataframe from the memory store; and
   when the dataframe is not present in the memory store, creating the dataframe for the dataset.

3. The method of claim 1, wherein the execution of the first run further comprises:
   identifying the dataset as being required to execute both the first run and the second run based on parameters received in the request to execute the first run, wherein the dataset requirement establishes the dependency between the first run and the second run; and
   updating the dataframe in a memory store with the updated dataframe based on the dataset requirement, and
   wherein during the execution of the second run, the updated dataframe for the same dataset is loaded from the memory store.

4. The method of claim 3, further comprising:
   upon updating the dataframe in the memory store with the updated dataframe, publishing, by the data processing system, a message to a topic of an event handler, wherein the message identifies the dataframe as being updated; and
   receiving, by the data processing system, a supplemental execution request to execute the second run using the update dataframe.

5. The method of claim 4, wherein:
   when the execution of the second run has already begun, the second run is stopped and checkpoints are saved, the second run is then restarted and the updated dataframe is used to process any task identified as requiring use of the same dataset from the saved checkpoints until completion of the second run; and when the execution of the second run has not already begun, the supplemental execution request is incorporated into the request to execute the second run such that the updated dataframe is used to process any task identified through-out the run as requiring use of the same dataset.

6. The method of claim 5, wherein the message further identifies a location of the updated dataframe in the memory store, the supplemental execution request is received from a listener that is subscribed to the topic of the event handler, and the supplemental execution request includes the location of the updated dataframe in the memory store.

7. The method of claim 6, wherein the first run is defined by a rule run framework to include the parameters, and the parameters identify the first run and the second run as requiring use of the same dataset for processing one or more tasks.

8. A non-transitory computer-readable memory storing a plurality of instructions executable by one or more processors, the plurality of instructions comprising instructions that when executed by the one or more processors cause the one or more processors to perform processing comprising:

receiving a request to execute a first run comprising a first set of tasks;

creating a first session to execute the first run;

executing the first run in the first session, wherein the execution of the first run comprises: identifying a task of the first set of tasks as requiring use of a dataset, obtaining a dataframe for the dataset, processing the task of the first set of tasks using the dataframe, and generating an updated dataframe based on the processing of the task;

receiving a request to execute a second run comprising a second set of tasks, wherein a dependency exists between the first run and the second run based on a requirement that the first run and the second run use the same dataset;

creating a second session to execute the second run; and executing the second run in the second session, wherein the execution of the second run comprises: identifying a task of the second set of tasks as requiring use of the same dataset, loading the updated dataframe for the same dataset, and processing the task of the second set of tasks using the updated dataframe.

9. The non-transitory computer-readable memory of claim 8, wherein the execution of the first run further comprises:

identifying the dataset as being required to execute both the first run and the second run based on parameters received in the request to execute the first run, wherein the dataset requirement establishes the dependency between the first run and the second run;

checking a map to determine whether the dataframe is present in a memory store based on the dataset requirement;

when the dataframe is present in the memory store, loading the dataframe from the memory store; and when the dataframe is not present in the memory store, creating the dataframe for the dataset.

10. The non-transitory computer-readable memory of claim 8, wherein the execution of the first run further comprises:

identifying the dataset as being required to execute both the first run and the second run based on parameters received in the request to execute the first run, wherein the dataset requirement establishes the dependency between the first run and the second run; and updating the dataframe in a memory store with the updated dataframe based on the dataset requirement, and wherein during the execution of the second run, the updated dataframe for the same dataset is loaded from the memory store.

11. The non-transitory computer-readable memory of claim 10, wherein the plurality of instructions further comprises instructions that when executed by the one or more processors cause the one or more processors to perform processing comprising:

upon updating the dataframe in the memory store with the updated dataframe, publishing, by the data processing system, a message to a topic of an event handler, wherein the message identifies the dataframe as being updated; and receiving, by the data processing system, a supplemental execution request to execute the second run using the update dataframe.

12. The non-transitory computer-readable memory of claim 11, wherein:

when the execution of the second run has already begun, the second run is stopped and checkpoints are saved, the second run is then restarted and the updated dataframe is used to process any task identified as requiring use of the same dataset from the saved checkpoints until completion of the second run; and when the execution of the second run has not already begun, the supplemental execution request is incorporated into the request to execute the second run such that the updated dataframe is used to process any task identified through-out the run as requiring use of the same dataset.

13. The non-transitory computer-readable memory of claim 12, wherein the message further identifies a location of the updated dataframe in the memory store, the supplemental execution request is received from a listener that is subscribed to the topic of the event handler, and the supplemental execution request includes the location of the updated dataframe in the memory store.

14. The non-transitory computer-readable memory of claim 13, wherein the first run is defined by a rule run framework to include the parameters, and the parameters identify the first run and the second run as requiring use of the same dataset for processing one or more tasks.

15. A system comprising:

one or more processors;

a memory coupled to the one or more processors, the memory storing a plurality of instructions executable by the one or more processors, the plurality of instructions comprising instructions that when executed by the one or more processors cause the one or more processors to perform processing comprising:

receiving a request to execute a first run comprising a first set of tasks;

creating a first session to execute the first run;

executing the first run in the first session, wherein the execution of the first run comprises: identifying a task of the first set of tasks as requiring use of a dataset, obtaining a dataframe for the dataset, processing the task of the first set of tasks using the dataframe, and generating an updated dataframe based on the processing of the task;

receiving a request to execute a second run comprising a second set of tasks, wherein a dependency exists between the first run and the second run based on a requirement that the first run and the second run use the same dataset;

creating a second session to execute the second run; and executing the second run in the second session, wherein the execution of the second run comprises: identifying a task of the second set of tasks as requiring use of the same dataset, loading the updated dataframe for the same dataset, and processing the task of the second set of tasks using the updated dataframe.

16. The system of claim 15, wherein the execution of the first run further comprises:

identifying the dataset as being required to execute both the first run and the second run based on parameters received in the request to execute the first run, wherein the dataset requirement establishes the dependency between the first run and the second run;

checking a map to determine whether the dataframe is present in a memory store based on the dataset requirement;

when the dataframe is present in the memory store, loading the dataframe from the memory store; and when the dataframe is not present in the memory store, creating the dataframe for the dataset.

17. The system of claim 15, wherein the execution of the first run further comprises:

identifying the dataset as being required to execute both the first run and the second run based on parameters received in the request to execute the first run, wherein the dataset requirement establishes the dependency between the first run and the second run; and updating the dataframe in a memory store with the updated dataframe based on the dataset requirement, and wherein during the execution of the second run, the updated dataframe for the same dataset is loaded from the memory store.

18. The system of claim 17, wherein the plurality of instructions further comprises instructions that when executed by the one or more processors cause the one or more processors to perform processing comprising:

upon updating the dataframe in the memory store with the updated dataframe, publishing, by the data processing system, a message to a topic of an event handler, wherein the message identifies the dataframe as being updated; and receiving, by the data processing system, a supplemental execution request to execute the second run using the update dataframe.

19. The system of claim 18, wherein:

when the execution of the second run has already begun, the second run is stopped and checkpoints are saved, the second run is then restarted and the updated dataframe is used to process any task identified as requiring use of the same dataset from the saved checkpoints until completion of the second run; and when the execution of the second run has not already begun, the supplemental execution request is incorporated into the request to execute the second run such that the updated dataframe is used to process any task identified through-out the run as requiring use of the same dataset.

20. The system of claim 19, wherein the message further identifies a location of the updated dataframe in the memory store, the supplemental execution request is received from a listener that is subscribed to the topic of the event handler, and the supplemental execution request includes the location of the updated dataframe in the memory store.

\* \* \* \* \*